US010541825B2

(12) United States Patent
Jin et al.

(10) Patent No.: US 10,541,825 B2
(45) Date of Patent: *Jan. 21, 2020

(54) METHOD, APPARATUS AND COMPUTER PROGRAM PRODUCT FOR GENERATING EXTERNALLY SHARED COMMUNICATION CHANNELS

(71) Applicant: Slack Technologies, Inc., San Francisco, CA (US)

(72) Inventors: Brenda Jin, San Francisco, CA (US); Sean Rose, San Francisco, CA (US); Myles Grant, San Carlos, CA (US); Elizabeth Johnston, San Francisco, CA (US); Andrew King, San Francisco, CA (US)

(73) Assignee: SLACK TECHNOLOGIES, INC., San Francisco, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 15/655,634

(22) Filed: Jul. 20, 2017

(65) Prior Publication Data
US 2019/0026298 A1 Jan. 24, 2019

(51) Int. Cl.
*G06F 7/00* (2006.01)
*G06F 17/30* (2006.01)
(Continued)

(52) U.S. Cl.
CPC ...... *H04L 12/1822* (2013.01); *G06F 3/04817* (2013.01); *G06F 16/13* (2019.01);
(Continued)

(58) Field of Classification Search
CPC .... G06F 16/27; G06F 3/04817; G06F 3/0482; G06Q 10/103; H04L 67/1097; H04L 67/42
See application file for complete search history.

(56) References Cited

U.S. PATENT DOCUMENTS 6,248,946 B1 * 6/2001 Dwek ................. G10H 1/0058
84/609
6,374,336 B1 4/2002 Peters et al.
(Continued)

OTHER PUBLICATIONS

Outgoing—ISA/210—International Search Report dated Nov. 8, 2018 for WO Application No. PCT/US18/043101.
(Continued)

*Primary Examiner* — Azam M Cheema
(74) *Attorney, Agent, or Firm* — Alston & Bird LLP

(57) ABSTRACT

Methods, apparatus and computer program product for creating an externally shared communication channel in a group-based communication platform are described herein. The group-based communication platform may have a plurality of database shards. A computer-implemented method may include receiving, from a first client device associated with an initiator group identification, a shared communication channel generation query associated with the initiator group identification and a target group identification; generating, in the group-based communication platform, a shared communication channel shard; transmitting, to a second client device associated with the target group identification, a shared communication channel acceptance request; receiving a shared communication channel acceptance notification; updating, in a main database, a shard referential table based on the initiator group identification, the target group identification, and the shared communication channel identification; and transmitting a shared communication channel interface of the shared communication channel based on the shared communication channel shard.

20 Claims, 11 Drawing Sheets

(51) Int. Cl.
| | |
|---|---|
| H04L 12/18 | (2006.01) |
| G06F 3/0481 | (2013.01) |
| G06F 16/27 | (2019.01) |
| G06F 16/13 | (2019.01) |
| H04L 29/08 | (2006.01) |
| G06Q 10/10 | (2012.01) |
| G06F 3/0482 | (2013.01) |
| H04L 29/06 | (2006.01) |

(52) U.S. Cl.
CPC ........... *G06F 16/27* (2019.01); *G06Q 10/103* (2013.01); *H04L 67/1097* (2013.01); *G06F 3/0482* (2013.01); *H04L 67/42* (2013.01)

(56) References Cited

U.S. PATENT DOCUMENTS

| | | | |
|---|---|---|---|
| 6,718,361 | B1 | 4/2004 | Basani et al. |
| 7,426,540 | B1 | 9/2008 | Matsumoto et al. |
| 7,644,144 | B1* | 1/2010 | Horvitz .................. G06Q 10/10 709/203 |
| 7,730,094 | B2 | 6/2010 | Kaler et al. |
| 8,185,448 | B1 | 5/2012 | Myslinski |
| 9,160,550 | B1 | 10/2015 | Morrison et al. |
| 9,940,394 | B1 | 4/2018 | Grant et al. |
| 2003/0084020 | A1 | 5/2003 | Shu |
| 2005/0171811 | A1* | 8/2005 | Campbell .............. G06Q 40/00 705/35 |
| 2006/0041661 | A1 | 2/2006 | Erikson et al. |
| 2007/0261102 | A1 | 11/2007 | Spataro et al. |
| 2008/0104665 | A1 | 5/2008 | Naldurg et al. |
| 2008/0183975 | A1 | 7/2008 | Foster et al. |
| 2009/0249396 | A1 | 10/2009 | Cheng et al. |
| 2010/0246535 | A1 | 9/2010 | Lindner |
| 2011/0137991 | A1 | 6/2011 | Russell |
| 2012/0246228 | A1 | 9/2012 | Udezue et al. |
| 2013/0325962 | A1 | 12/2013 | Verma et al. |
| 2014/0012814 | A1 | 1/2014 | Bercovici et al. |
| 2015/0169253 | A1 | 6/2015 | Donlan |
| 2015/0282102 | A1 | 10/2015 | Kakishima et al. |
| 2015/0358234 | A1 | 12/2015 | Krieger |
| 2016/0259797 | A1* | 9/2016 | Lewis .................. G06F 16/738 |
| 2016/0306854 | A1 | 10/2016 | Hegde et al. |
| 2017/0103116 | A1 | 4/2017 | Hu et al. |
| 2017/0109013 | A1 | 4/2017 | Hong |
| 2017/0169800 | A1 | 6/2017 | Greco et al. |
| 2018/0046730 | A1 | 2/2018 | De et al. |
| 2018/0197144 | A1 | 7/2018 | Frank et al. |
| 2018/0314750 | A1 | 11/2018 | Merriman et al. |
| 2019/0028287 | A1 | 1/2019 | Jin et al. |

OTHER PUBLICATIONS

ISA/206—Invitation to Pay Additional Fees dated Aug 29, 2018 for WO Application No. PCT/US18/043101.

Slackline-Shared Channels across Slack teams [online][retrieved Oct. 2, 2017]. Retrieved from the Internet: <URL: https://web.archive.org/web/20170630031530/https://slackline.io/>. (Jun. 30, 2017) 4 pages.

Quinde—Share channels between Slack teams [online][retrieved Oct. 2, 2017]. Retrieved from the Internet: <URL: https://quinde.io/> . 3 pages.

Frequent questions—Slackline [online][retrieved Oct. 2, 2017]. Retrieved from the Internet: <URL: https://web.archive.org/web/20170606091157/https://slackline.io/faqs>. (Jun. 6, 2017) 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, 27 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.bd>. (dated May 1993) 66 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", Pandodaily, Lexisnexis, https://advance.lexis.com/api/permalink/dd2d4ee5-2ddf-4d3a-ald9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Matsumoto, T. et al., "Chocoa Communicator—A New Communication System Based on Awareness and Text Communications—", Fujitsu Sci. Tech. J., 36, 2, (Dec. 2000) 154-161.

* cited by examiner

METHOD, APPARATUS AND COMPUTER PROGRAM PRODUCT FOR GENERATING EXTERNALLY SHARED COMMUNICATION CHANNELS

BACKGROUND

Various systems are configured to create externally shared communication channels. Applicant has identified many deficiencies and problems associated with existing systems. Through applied effort, ingenuity, and innovation, many of these identified deficiencies and problems have been solved by developing solutions that are in accordance with the embodiments of the present invention, many examples of which are described in detail herein.

BRIEF SUMMARY

In general, embodiments of the present invention provide methods, apparatus, systems, computing devices, and/or the like for generating externally shared communication channels.

In accordance with one aspect, a computer-implemented method product for creating an externally shared communication channel in a group-based communication platform is provided. The group-based communication platform may have a plurality of database shards. The computer-implemented method may include receiving, from a first client device associated with an initiator group identification, a shared communication channel generation query associated with the initiator group identification and a target group identification; generating, in the group-based communication platform, a shared communication channel shard, wherein the shared communication channel shard is assigned a shared communication channel identification, and the group-based communication platform includes a first database shard associated with the initiator group identification and a second database shard associated with the target group identification; transmitting, to a second client device associated with the target group identification, a shared communication channel acceptance request, wherein the shared communication channel acceptance request is associated with the shared communication channel identification; receiving a shared communication channel acceptance notification, wherein the shared communication channel acceptance notification includes an electronic approval to associate the shared communication channel identification with the target group identification; updating, in a main database, a shard referential table based on the initiator group identification, the target group identification, and the shared communication channel identification; and transmitting, to each of the first client device and the second client device, an externally shared group-based shared communication channel interface of the shared communication channel based on the shared communication channel shard.

In accordance with another aspect, the shard referential table includes a first referential connection between the initiator group identification and the first database shard, and a second referential connection between the target group identification and the second database shard.

In accordance with another aspect, updating the shard referential table may further include identifying, based on the initiator group identification, the first referential connection in the shard referential table; identifying, based on the target group identification, the second referential connection in the shard referential table; and generating a third referential connection between the first referential connection, the second referential connection, and the shared communication channel identification.

In accordance with another aspect, a computer-implemented method of updating a group-based communication interface of a client device is provided. The group-based communication interface may define a channel list pane comprising a plurality of group-based communication channels and a channel messaging pane. The method may include receiving an externally shared communication channel generation request, wherein the externally shared communication channel generation request includes a first group identification and a second group identification; determining whether the client device is associated with one of the first group identification or the second group identification; and in response to determining that the client device is associated with one of the first group identification or the second group identification, generating, in the channel list pane, an externally shared communication channel list subpane.

In accordance with another aspect, the externally shared communication channel list subpane indicates a list of one or more externally shared communication channels associated with the client device In accordance with another aspect, the externally shared communication channel generation request further includes a first externally shared communication channel indicator associated with the first group identification, and a second externally shared communication channel indicator associated with the second group identification, wherein generating, in the channel list pane, the externally shared communication channel list subpane further includes: in response to determining that the client device is associated with the first group identification, displaying, in the externally shared communication channel list subpane, the first externally shared communication channel indicator; and in response to determining that the client device is associated with the second group identification, displaying, in the externally shared communication channel list subpane, the second externally shared communication channel indicator.

In accordance with another aspect, an apparatus comprising at least one processor and at least one non-transitory memory is provided. In some embodiments, the at least one non-transitory memory and the program code configured to, with the processor, cause the apparatus to at least receive, from a first client device associated with an initiator group identification, a shared communication channel generation query associated with the initiator group identification and a target group identification; generate, in the group-based communication platform, a shared communication channel shard, wherein the shared communication channel shard is assigned a shared communication channel identification, and the group-based communication platform includes a first database shard associated with the initiator group identification and a second database shard associated with the target group identification; transmit, to a second client device associated with the target group identification, a shared communication channel acceptance request, wherein the shared communication channel acceptance request is associated with the shared communication channel identification; receive a shared communication channel acceptance notification, wherein the shared communication channel acceptance notification includes an electronic approval to associate the shared communication channel identification with the target group identification; update, in a main database, a shard referential table based on the initiator group identification, the target group identification, and the shared communication channel identification; and transmit, to each of the first client device and the second client device, an externally shared group-based shared communication channel interface of the shared communication channel based on the shared communication channel shard.

In accordance with another aspect, a computer program product is provided. The computer program product may comprise at least one computer-readable storage medium having computer-readable program code portions stored therein, the computer-readable program code portions comprising executable portions configured to receive, from a first client device associated with an initiator group identification, a shared communication channel generation query associated with the initiator group identification and a target group identification; generate, in the group-based communication platform, a shared communication channel shard, wherein the shared communication channel shard is assigned a shared communication channel identification, and the group-based communication platform includes a first database shard associated with the initiator group identification and a second database shard associated with the target group identification; transmit, to a second client device associated with the target group identification, a shared communication channel acceptance request, wherein the shared communication channel acceptance request is associated with the shared communication channel identification; receive a shared communication channel acceptance notification, wherein the shared communication channel acceptance notification includes an electronic approval to associate the shared communication channel identification with the target group identification; update, in a main database, a shard referential table based on the initiator group identification, the target group identification, and the shared communication channel identification; and transmit, to each of the first client device and the second client device, an externally shared group-based shared communication channel interface of the shared communication channel based on the shared communication channel shard.

BRIEF DESCRIPTION OF THE DRAWINGS

Figure 1:
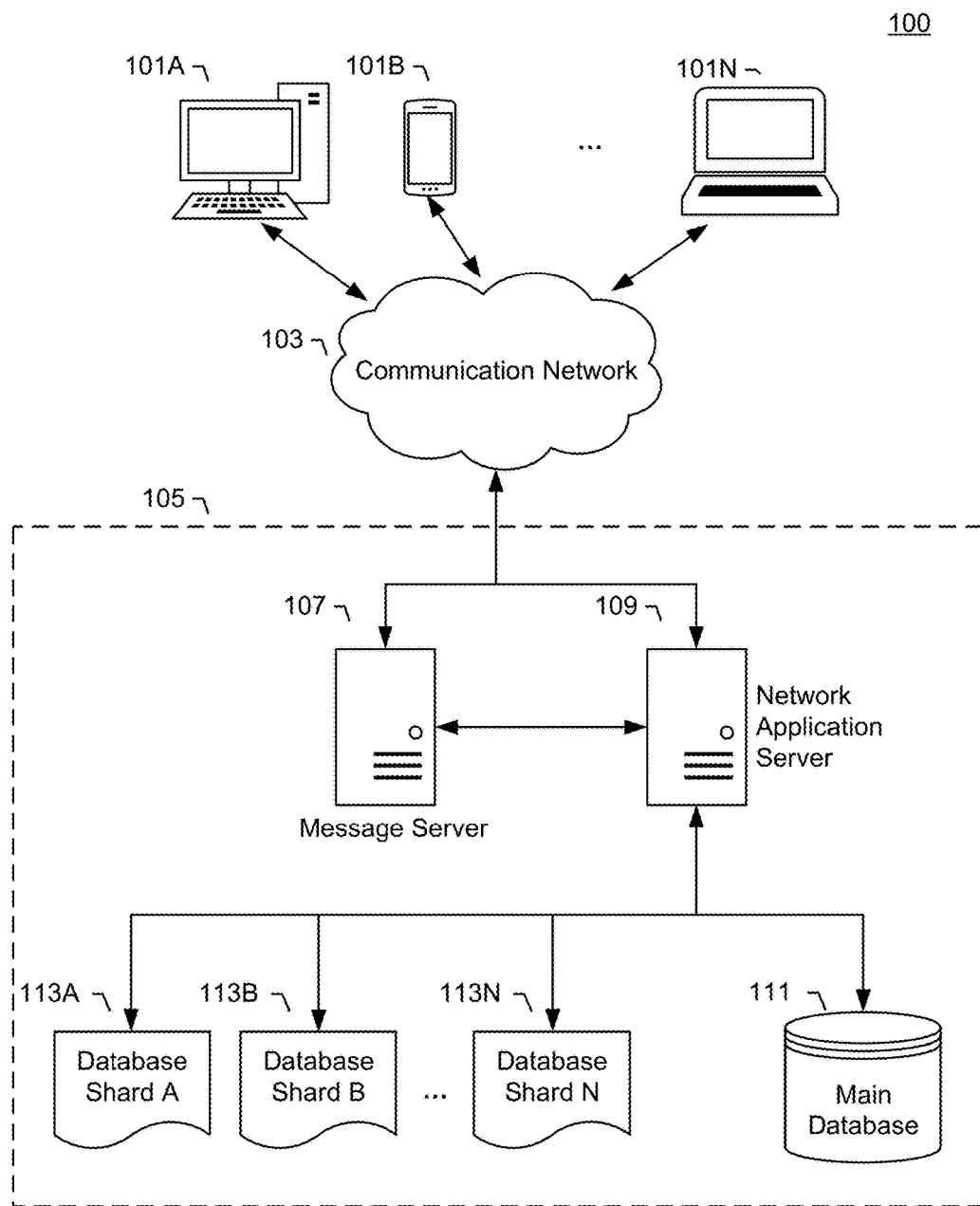
Figure 2:
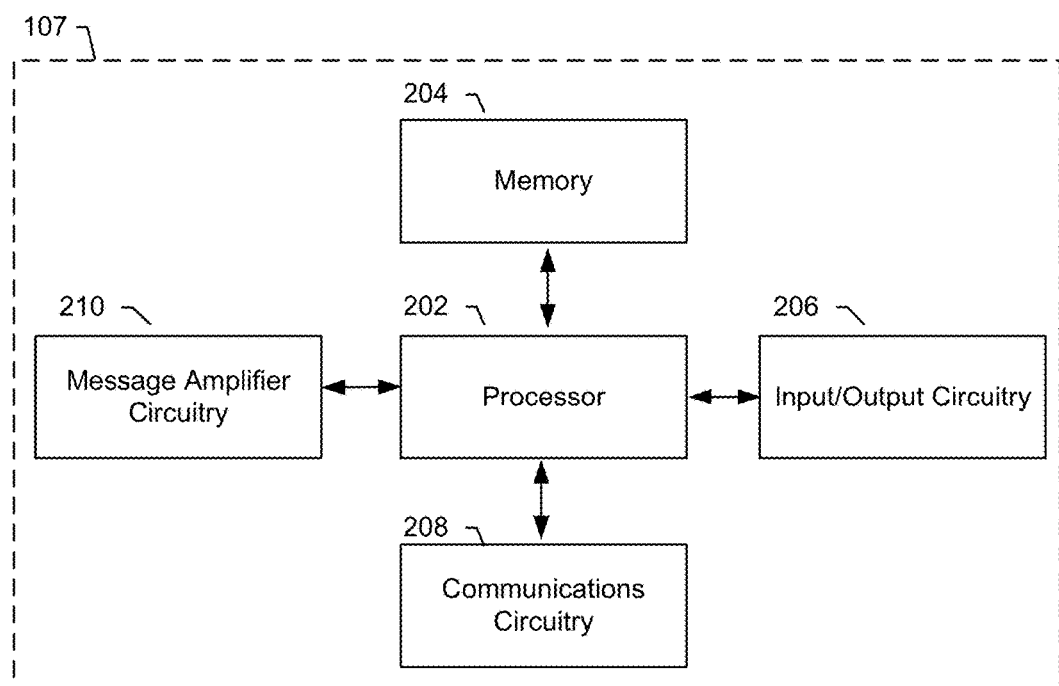
Figure 3:
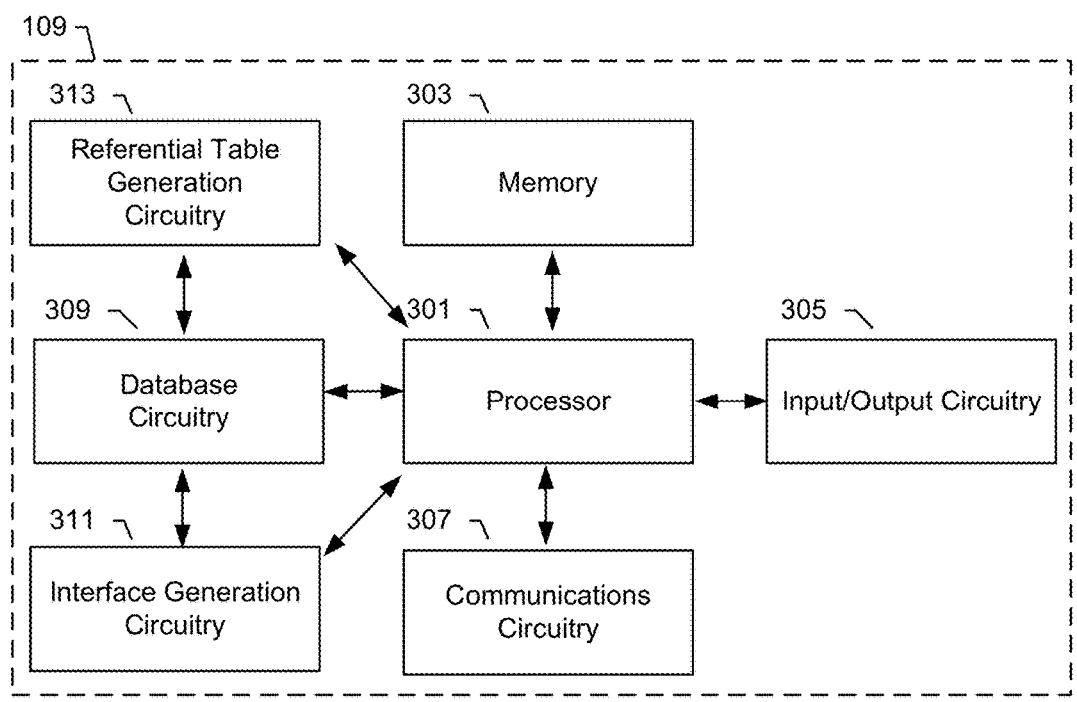
Figure 4:
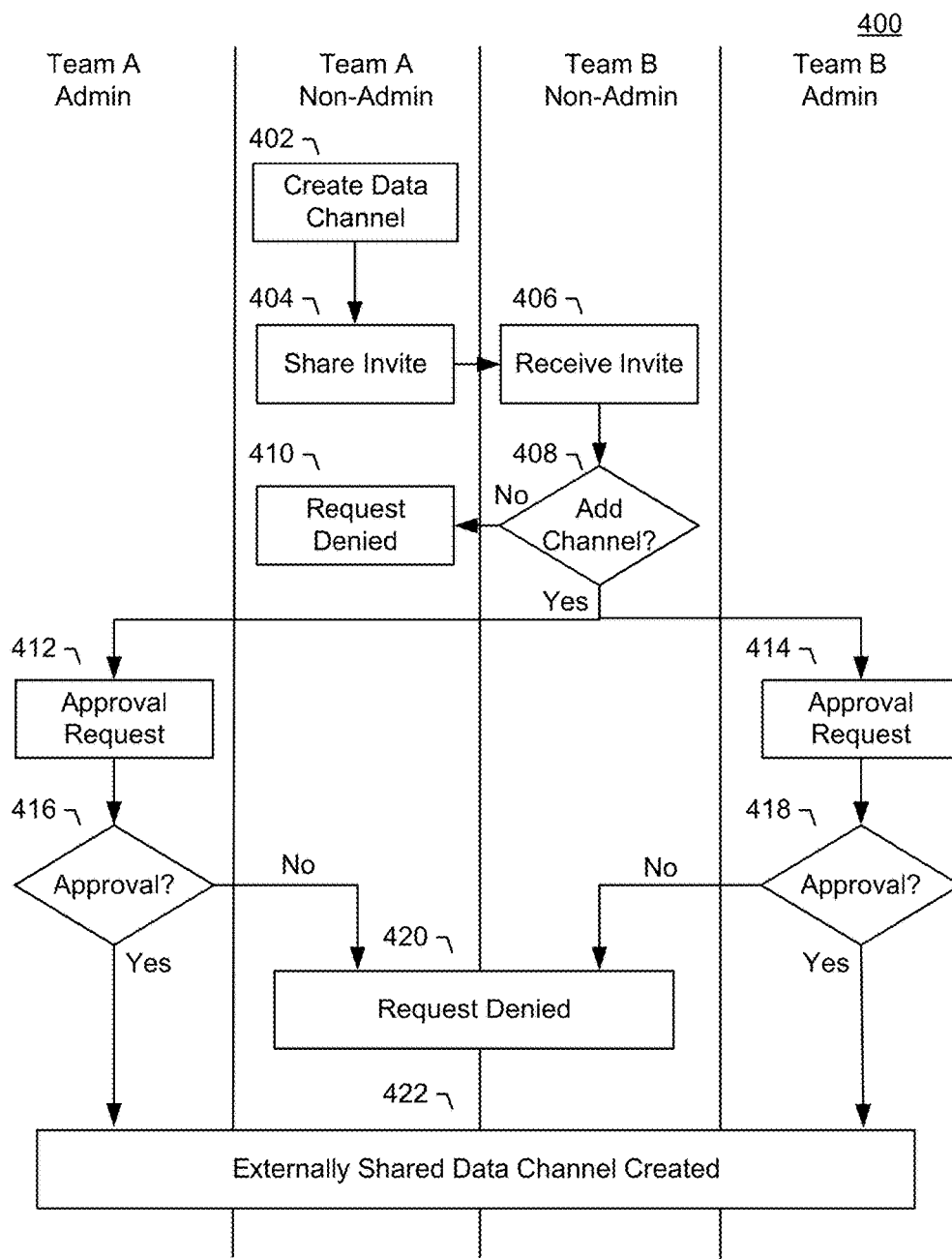
Figure 5:
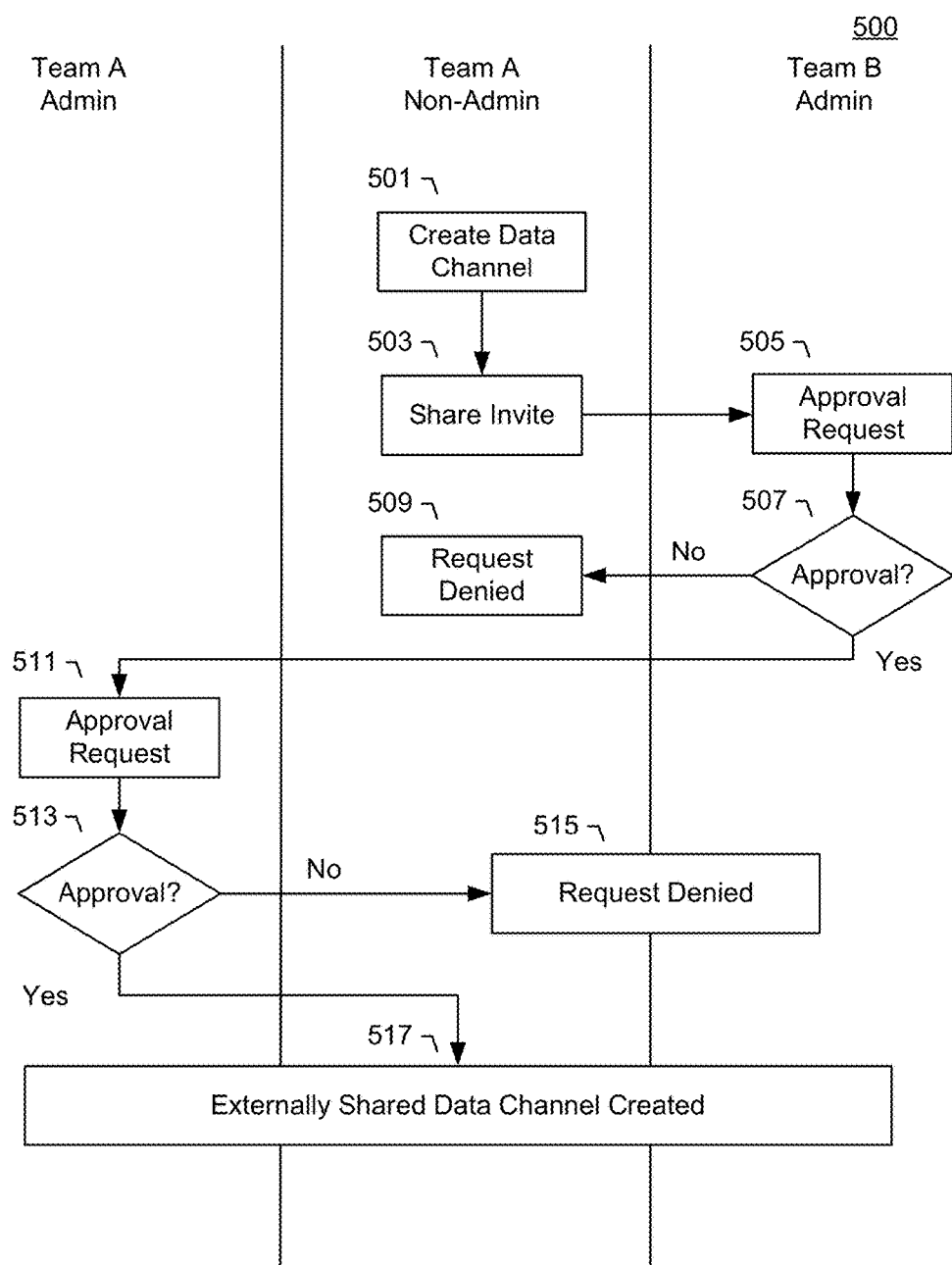
Figure 6:
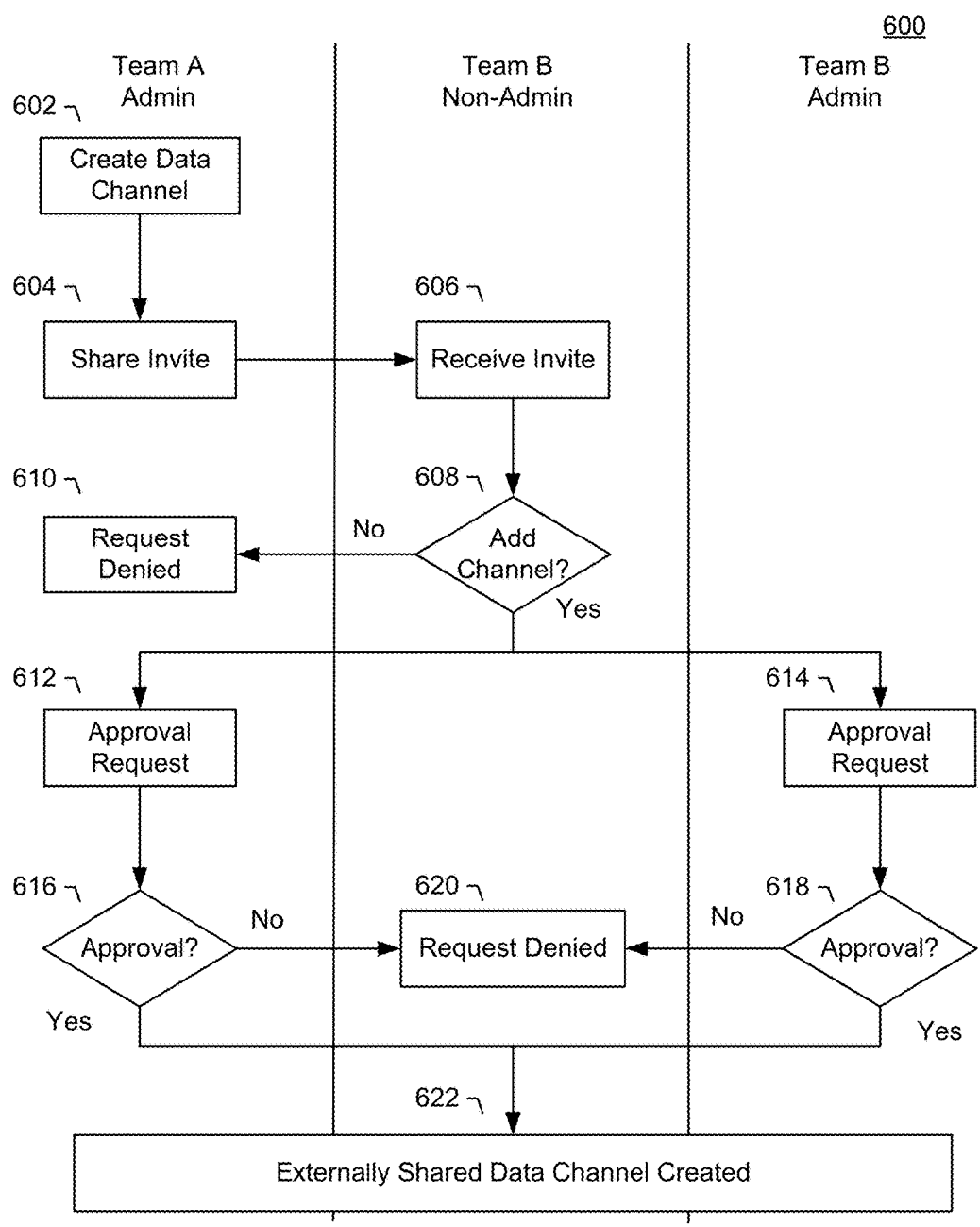
Figure 7:
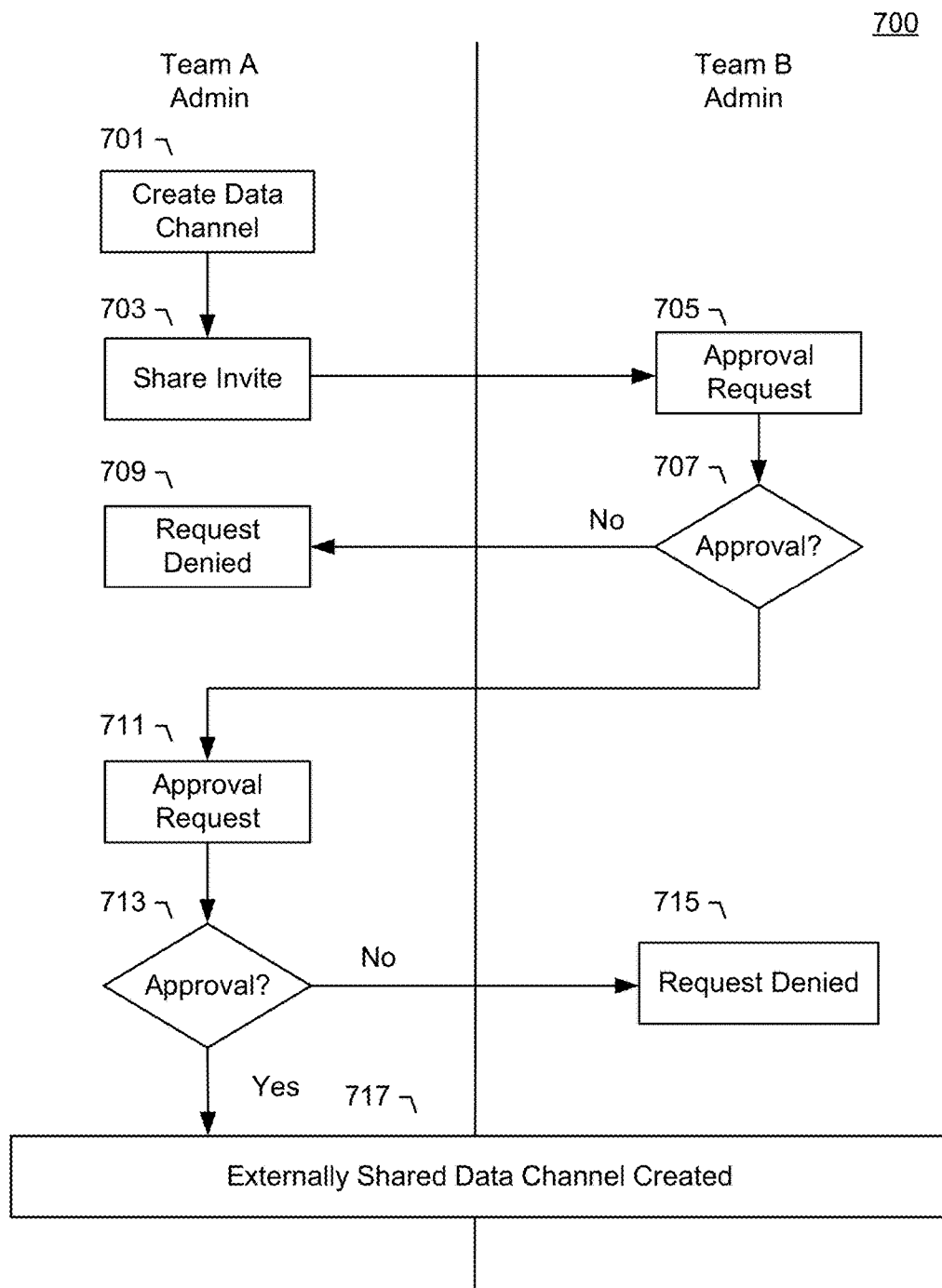

Having thus described some embodiments in general terms, references will now be made to the accompanying drawings, which are not necessarily drawn to scale, and wherein:

FIG. 1 is an exemplary system architecture diagram of a group-based communication platform in accordance with some embodiments of the present invention;

FIG. 2 is an exemplary schematic diagram of a message server in accordance with some embodiments of the present invention;

FIG. 3 is an exemplary schematic diagram of a network application server in accordance with some embodiments of the present invention;

FIG. 4 is an exemplary flow chart illustrating an exemplary method in accordance with some embodiments of the present invention;

FIG. 5 is an exemplary flow chart illustrating an exemplary method in accordance with some embodiments of the present invention;

FIG. 6 is an exemplary flow chart illustrating an exemplary method in accordance with some embodiments of the present invention;

FIG. 7 is an exemplary flow chart illustrating an exemplary method in accordance with some embodiments of the present invention; and FIGS. 8A, 8B, 8C, and 8D illustrate various elements of exemplary user interfaces in accordance with some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the invention relate generally to the creation of externally shared communication channels in a group-based communication platform. The group-based communication platform is configured to communicate with a plurality of client devices and operates a plurality of network databases. Each of the client devices may be associated with a group identification, which may indicate a group or an organization that the client device is associated with. For example, a particular organization may have a plurality of client devices connected to a group-based communication platform, and the group-based communication platform identifies each client device as being associated with that particular organization.

The group-based communication platform also includes a plurality of database shards, and each database shard stores data related to a particular group identification. For example, a database shard may store electronic communication data associated with members of a particular organization, which enables members of that particular organization to communicate and exchange data with other members of the same organization in real-time. In this example, the organization itself is the owner of the database shard, and has control over where and how the related data is stored. This simplifies many technical tasks, such as data retention, unfurling, and integration settings.

However, existing systems and approaches are plagued by many technical restrictions and limitations, as they do not provide support for data exchange and communication between different organizations, as each database shard can only be owned by a single organization. For example, when a user Tony of organization X intends to share data (stored in the organization X's database shard) with another user Frank of organization Y, Tony will have to exchange said data through other communication means, which may cause communication delays and inefficiencies. As data can be time-sensitive and dynamic in nature, technical limitations of existing systems may compromise data integrity and deplete network resources.

In addition, existing systems are not configured to manage user identities in externally shared communication channels. For example, Tony may be a member of both organization X and organization Z. Tony may have an identity ("Tony-X") associated with communication channels in organization X, and another identity ("Tony-Z") associated with communication channels in organization Z. In an externally shared communication channel connecting organization X and organization Z, existing systems are unable to reconcile "Tony-X" and "Tony-Z," and may falsely determine that "Tony-X" and "Tony-Z" are two different individuals. Existing systems may determine Tony as a member at organization X, but as an individual or a guest at organization Z, which may create conflicts in data management.

Systems structured in accordance with various embodiments of the invention overcome challenges faced by existing systems.

Continuing from the "Tony to Frank" discussion above, Tony in a group-based communication platform (e.g. a cloud-based group collaboration tool provided by SLACK®) that is structured in accordance with various embodiments of the invention is able to exchange data in real-time with Frank through an externally shared communication channel. In other words, members of organization X and organization Y are able to view content and share data in the externally shared communication channel as if they belong to the same organization. Network applications and other software integrations continue to work in the externally shared communication channel, and each organization maintains its own preferences that apply to its respective channel experience.

Continuing from the "Tony-X/Tony-Z" discussion above, in a group-based communication platform that is structured in accordance with various embodiments of the invention, Tony is assigned an unified identity that recognizes Tony as a member of both organization X and organization Z. In other words, the cloud-based group collaboration tool provided by SLACK® is able to create union of identities that may recognize individuals as members of separate teams.

From the user experience perspective, systems structured in accordance with various embodiments of the invention greatly enhance organizational productivity and efficiency. They also reduce the need for other forms of communications (such as electronic mail), and provide better collaboration between different organizations while eliminating channel disconnections between teams. In addition, they are configured to provide asymmetrical and customizable privacy settings, where an externally shared communication channel between two teams may have one privacy configuration for one team and a different configuration for the other. Further, externally shared communication channels may create cross-network effects, which increases user retention rates from different organizations or different groups.

From the developer's perspective, systems structured in accordance with various embodiments of the invention provide support for the retrieval and appropriate visibility of data, while providing the flexibility of retention settings. They also enable the selective connection of channels, as well as teams based on channels.

As such, systems structured in accordance with various embodiments of the invention provide specific, technical solutions to technical problems faced by existing systems, the details of which are described hereinafter.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., j doe), a password, a real name, a time zone, a status, and the like. The user account details can include a subset designation of user credentials, such as, for example, login information for the user including the user's username and password.

The term "client device" refers to computer hardware(s) and/or software(s) that is/are configured to access one or more services made available by one or more servers. The server(s) is/are often (but not always) on another computer system, in which case the client device accesses the service by way of a network. A client device may be associated with a group identification, where the group identification is an electronic indication that suggests a group (e.g. user group) that the user belongs to. Client devices may include, without limitation, smart phones, tablet computers, laptop computers, desktop computers, wearable devices, personal computers, enterprise computers, and the like.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows.

The term "communication channel" refers to an information route and associated circuitry that is used for data exchange between and among systems and parts of systems. For example, a communication channel may be established between and among various client devices, allowing these client devices to communicate and share data between and among each other. A communication channel identification may be assigned to a communication channel, which indicates the physical address in a database where related data of that communication channel is stored. A communication channel may be "public," which may allow any client device to join and participate in the information sharing through the communication channel. A communication channel may be "private," which may restrict data communications in the communication channel to certain client devices and/or users.

The term "group-based communication channel interface" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

As used herein, the terms "messaging communication" and "message" refer to any electronically generated digital content object provided by a user using a client device and that is configured for display within a group-based communication channel. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "query" refers to a request associated with a database. A "query" may be generated on one or more client devices, and may be transmitted to a group-based communication platform. A query may be a "select query," which is used to extract data from the database in a readable format according to the query. A query may be an "action query," which asks for operations (such as insertion, deletion, and/or updating) on the data stored in a network database. For example, a "communication channel generation query" is an action query that requests the generation of a communication channel.

The term "shard" refers to a collection of related, discrete items of data that may be accessed and managed individually. A shard may be stored in a single database, or optionally spread across multiple databases. This is particularly beneficial when there is a large amount of data. The cost of creating and maintaining a very large database in one place can increase exponentially because the database will require more high-end computers. In contrast, database shards can be distributed across a number of much less expensive commodity databases. "Sharding" refers to partitioning a large database to make it more manageable. Because sharding a database involves breaking up the database into smaller databases that share nothing in common, it causes technical difficulties to create a communication channel that involves two or more database shards. Database may be "sharded" based on a variety of factors, including, but not limited to, channel identifications, user identifications, team identifications, or any attribute of data within database structure. To determine which factor(s) to use, the system may consider data isolation, proximity of data (for the purposes of lookup), and performance/speed of access across a distributed system. The system may need to take into account both the volume of data and the speed with which the system is required to retrieve such data.

The term "referential table" refers to a set of referential connections between and among various data items. A referential table may be in a tabular form, which may include "rows" and "columns." Each row may represent a referential connection, and each column may represent a data item. A data item may be a group identification, a channel identification, a physical address in a network database, and the like. A referential connection may indicate the relationships and/or constraints between and among various data items. For example, a shard referential table may identify a physical address of a communication channel shard in a network database based on an identification of that communication channel. The shard referential table may include parameters, such as database shard parameter, message server shard parameter, redis shard parameter, solr shard parameter, team metadata (e.g., date create, date archive, date delete), admin user data, domain, email domain, preferences, invites, credits, payment tier, and data indicating whether the team is an enterprise.

The term "event" refers to identifiable, non-transitory occurrence that has technical significance for system hardware and/or software. An event may represent some message, token, count, pattern, value, or marker that can be recognized by a computer system. An application may be triggered to perform certain functions based on the event. For example, in a group-based communication channel, a message sent by a user is an event for applications that utilize the event application programming interface (API). An event may be user-generated, such as keystrokes or mouse movements, or system-generated, such as program loading and errors.

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates an example computing system 100 within which embodiments of the present invention may operate. Users may access a group-based communication platform 105 via a communication network 103 using client devices 101A-101N.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 103 may include a cellular telephone, an 802.11, 802.16, 802.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication platform 105 may include a message server 107 and a network application server 109. The network application server 109 may communicate with a main database 111 and one or more database shards 113A-113N.

The message server 107 may be embodied as a computer or computers as known in the art. The message server 107 may provide for receiving electronic data from various sources, including, but not limited to, the client devices 101A-101N via the communication network 103. For example, the message server 107 may be operable to receive and process electronic messages provided by the client devices 101A-101N. The message server 107 may also facilitate transmission and amplification of electronic messages to the client devices 101A-101N.

Similarly, the network application server 109 may be embodied as a computer or computers as known in the art. The network application server 109 may provide for receiving electronic data from various sources, including, but not limited to, the client devices 101A-101N via the communication network 103. For example, the network application server 109 may be operable to receive and process electronic messages provided by the client devices 101A-101N. The network application server 109 may also be operable to receive and process network database queries provided by the client devices 101A-101N and/or the message server 107 regarding the main database 111 and/or one or more database shards 113A-113N. The network application server 109 may further facilitate the generation of user interfaces.

The client devices 101A-101N may be any computing device as defined above. Electronic data received by the message server 107 and the network application server 109 from the client devices 101A-101N may be provided in various forms and via various methods.

In some preferred and non-limiting embodiments, one or more of the client devices 101A-101N are mobile devices, such as smartphones or tablets. The one or more client devices may execute an "app" to interact with the message server 107 and/or network application server 109. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system.

In some preferred and non-limiting embodiments, the client devices 101A-101N may interact with the message server 107 and/or network application server 109 via a web browser. The client devices 101A-101N may also include various hardware or firmware designed to interact with the message server 107 and/or network application server 109.

In some preferred and non-limiting embodiments, the database shards 113A-113N may be embodied as a data storage device such as a network attached storage (NAS) device or devices, or as a separate database server or servers. The database shards 113A-113N include information accessed and stored by the network application server 109. For example, the database shards 113A-113N may include, without limitation, user profiles, user privilege information, electronic files, messaging communications organized among a plurality of group-based communication channels, and/or the like.

In some preferred and non-limiting embodiments, the main database 111 may be embodied as a data storage device such as a network attached storage (NAS) device or devices, or as a separate database server or servers. The main database 111 includes information accessed and stored by the network application server 109. For example, the main database 111 may include, without limitation, a shard referential table.

In some embodiments of an exemplary group-based communication platform 105, a message or messaging communication may be sent from a client device 101A-101N to a group-based communication platform 105. In various implementations, messages may be sent to the group-based communication platform 105 over communication network 103 directly by one of the client devices 101A-101N. The messages may be sent to the group-based communication platform 105 via an intermediary such as a message server, and/or the like. For example, a client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
```

```
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a copy our patent
policy.</contents>
        <attachments>patent_policy.pdf</attachments>
    </message>
</auth_request>
```

The group-based communication platform 105 comprises at least one message server 107 that may create a storage message based upon the received message to facilitate message indexing and storage in one or more database shards 113A-113N. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
```

```
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached a copy our patent policy.</contents>
    <attachments>patent_policy.pdf</attachments>
    <conversation_primitive>
        conversation includes messages: ID_message_8, ID_message_9, ID message_10,
        ID_message_11, ID_message_12
    </conversation_primitive>
</storage_message>
```

In some embodiments, a group identifier as defined above may be associated with the message. In some embodiments, a group-based communication channel identifier as defined above may be associated with the message.

In some embodiments, a sending user identifier as defined above may be associated with the message. In one implementation, the message may be parsed (e.g., using PHP commands) to determine a sending user identifier of the user who sent the message.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from the message server 107). In one implementation, a storage message may be sent from group-based communication server 106 to facilitate indexing in the message server 107. In another implementation, metadata associated with the message may be determined and the message may be indexed in the message server 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in the message server 107 to facilitate searching. In one embodiment, the files may be indexed such that a company's or a group's files are indexed at a separate distributed repository.

An example of electronic information exchange among one or more client devices 101A-101N and the group-based communication platform 105 is described below.

The one or more client devices 101A-101N are configured to generate one or more shared communication channel generation queries associated with the database shards 113A-113N. Continuing from the "Tony to Frank" discussion, Tony may use client device 101A (having a group identification associated with organization X) to generate a shared communication channel generation query, requesting the creation of an externally shared communication channel with Frank's client device 101B (having a group identification associated with organization Y). Organization X and organization Y are each associated with a separate shard of database shards 113A-113N. The shared communication channel generation query may be transmitted to the group-based communication platform 105 via the communication network 103.

Upon receiving the one or more shared communication channel generation queries from the one or more client devices 101A-101N, the group-based communication platform 105 may utilize the network application server 109 to generate one or more database shards based on the one or more shared communication channel generation queries. The network application server 109 may further assign a shared communication channel identification to each of the one or more generated database shards. Continuing from the previous example, the network application server 109 may generate a database shard 113N based on the shared communication channel generation query provided by Tony via the client device 101A, and may associate a shared communication channel identification with the database shard 113N.

After generating one or more database shards based on one or more shared communication channel generation queries, the group-based communication platform 105 may transmit one or more shared communication channel acceptance requests to one or more client devices 101A-101N. Continuing from the previous example, the group-based communication platform 105 may transmit a shared communication channel acceptance request to client device 101B (Frank), which is indicated in the shared communication channel generation query provided by client device 101A (Tony).

Upon receiving the shared communication channel acceptance request, the one or more client devices 101A-101N may generate one or more electronic approvals, and may transmit these electronic approvals to the group-based communication platform 105. Continuing from the previous example, Frank, via client device 101B, may generate an electronic approval in response to the shared communication channel acceptance request. The electronic approval may indicate Frank's acceptance of the shared communication channel generation query provided by Tony. The client device 101B may further transmit the electronic approval to the group-based communication platform 105.

Upon receiving the one or more electronic approvals from one or more client devices 101A-101N, the group-based communication platform 105 associates the one or more channel identifications with the one or more client devices 101A-101N through a shard referential table stored in the main database 111. Continuing from the previous example, upon receiving an electronic approval from client device 101B, the group-based communication platform 105 may further update the shard referential table stored in the main database 111 based on the organization X identification, organization Y identification, and the shared communication channel identification of the newly created database shard, such as database shard 113N.

By generating a shared communication channel shard and updating the shard referential table, the present invention provides many technical advantages over existing systems, such as solving the union of identities issue. Continuing from the "Tony-X/Tony-Z" example above, an externally shared communication channel between organization X and organization Z, created based on the present invention, is able to reconcile Tony's two identities, Tony-X and Tony-Z, in two separated organization. While updating the shard referential table, systems structured in accordance with embodiments of present invention are able to identify duplicate user identities by, for example, searching and comparing data associated with each organization. Upon determining that Tony-X and Tony-Y are associated with the same individual, systems structured in accordance with embodiments of present invention assign a unified identity to Tony in the shared communication channel shard. Existing systems, on the other hand, are unable to solve the union of identities issue, as they fail to create a shared communication channel shard and/or update a shard referential table.

The group-based communication platform 105 may further generate one or more interfaces for the one or more generated database shards, and may transmit the one or more interfaces to the client devices 101A-101N. Continuing from the previous example, the group-based communication platform 105 may generate a user interface for the database shard 113N, and transmit the user interface to client devices 101A and 101B. In some embodiments, the group-based communication platform 105 may send only the appropriate data/interface to client devices 101A and 101B, or may retrieve and cache the data before sending it to client devices 101A and 101B, or may compile an interface program that can be used as part of apps on client devices 101A and 101B.

In some preferred and non-limiting embodiments, the referential table stored in the main database 111 may indicate referential connections between a group identification and a database shard of database shards 113A-113N. Continuing form the previous example, client devices 101A and 101C may be both associated with organization X identification, and the shard referential table may indicate that data related to communications between client devices 101A-101B are stored in database shard 113A.

In some preferred and non-limiting embodiments, when the group-based communication platform 105 receives one or more electronic approvals from one or more client devices 101A-101N, the group-based communication platform 105 may update the shard referential table stored in the main database 111 by generating a new referential connection. For example, after receiving an electronic approval to create a shared communication channel between organization X and organization Y, the group-based communication platform 105 may update the shard referential table, indicating the referential connection between organization X identification, organization Y identification, and the identification of the newly generated database shard.

In some preferred and non-limiting embodiments, the group-based communication platform 105 may amplify electronic messages received from one or more client devices 101A-101N in an externally shared communication channel to other client devices in the same channel using the message server 107. For example, the message server 107 may receive an electronic message from client device 101A in association with an externally shared communication channel. The message server 107 may query the network application server 109, which in turn identifies one or more client devices associated with the externally shared communication channel based on the shard referential table stored in the main database 111. The message server 107 may further transmit the electronic message to each identified client device.

The above-referenced electronic information exchange provides various technical advantages over existing systems. For example, it allows information retrieval and dispatch of data without the over-burdening of messages dispatched to the communication network 103. In addition, the robustness of data, along with the dispatch speed based on the configuration of the communication network 103, provides the group-based communication platform 105 the option to utilize either the message server 107 or the network application server 109. Further, it provides an option for external applications (developed for the group-based communication platform 105) to use websocket or RPC APIs (which may further use the message server 107 or the network application server 109) to emit messages, as further discussed below.

Example Apparatus for Implementing Embodiments of the Present Invention

The message server 107 may be embodied by one or more computing systems, such as apparatus 200 shown in FIG. 2. The apparatus 200 may include processor 202, memory 204, input/output circuitry 206, communications circuitry 208, and message amplifier circuitry 210. The apparatus 200 may be configured to execute the operations described above with respect to FIG. 1 and below with respect to FIGS. 4-7. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Message amplifier circuitry 210 includes hardware configured to copy and amplify electronic messages and associated metadata received from one or more client devices to other client devices based on the database shard(s). The message amplifier circuitry 210 may utilize processing circuitry, such as the processor 202, to perform these actions. However, it should also be appreciated that, in some embodiments, the message amplifier circuitry 210 may include a separate processor, specially configured Field Programmable Gate Array (FPGA), or Application Specific Integrated Circuit (ASIC) for performing the functions described herein. The message amplifier circuitry 210 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

The network application server 109 may be embodied by one or more computing systems, such as apparatus 300 shown in FIG. 3. The apparatus 300 may include processor 301, memory 303, input/output circuitry 305, communications circuitry 307, database circuitry 309, interface generation circuitry 311, and referential table generation circuitry 313. The apparatus 300 may be configured to execute the operations described above with respect to FIG. 1 and below with respect to FIGS. 4-7. Although these components 301-313 are described with respect to functional limitations, it should be understood that the particular implementations necessarily include the use of particular hardware. It should also be understood that certain of these components 301-313 may include similar or common hardware. For example, two sets of circuitries may both leverage use of the same processor, network interface, storage medium, or the like to perform their associated functions, such that duplicate hardware is not required for each set of circuitries.

In some embodiments, the processor 301 (and/or co-processor or any other processing circuitry assisting or otherwise associated with the processor) may be in communication with the memory 303 via a bus for passing information among components of the apparatus. The memory 303 is non-transitory and may include, for example, one or more volatile and/or non-volatile memories. In other words, for example, the memory 303 may be an electronic storage device (e.g., a computer-readable storage medium). The memory 303 may be configured to store information, data, content, applications, instructions, or the like for enabling the apparatus 300 to carry out various functions in accordance with example embodiments of the present invention.

The processor 301 may be embodied in a number of different ways and may, for example, include one or more processing devices configured to perform independently. In some preferred and non-limiting embodiments, the processor 301 may include one or more processors configured in tandem via a bus to enable independent execution of instructions, pipelining, and/or multithreading.

In some preferred and non-limiting embodiments, the processor 301 may be configured to execute instructions stored in the memory 303 or otherwise accessible to the processor 301. In some preferred and non-limiting embodiments, the processor 301 may be configured to execute hard-coded functionalities. As such, whether configured by hardware or software methods, or by a combination thereof, the processor 301 may represent an entity (e.g., physically embodied in circuitry) capable of performing operations according to an embodiment of the present invention while configured accordingly. Alternatively, as another example, when the processor 301 is embodied as an executor of software instructions, the instructions may specifically configure the processor 301 to perform the algorithms and/or operations described herein when the instructions are executed.

In some embodiments, the apparatus 300 may include input/output circuitry 305 that may, in turn, be in communication with processor 301 to provide output to the user and, in some embodiments, to receive an indication of a user input. The input/output circuitry 305 may comprise a user interface and may include a display, and may comprise a web user interface, a mobile application, a client device, a kiosk, or the like. In some embodiments, the input/output circuitry 305 may also include a keyboard, a mouse, a joystick, a touch screen, touch areas, soft keys, a microphone, a speaker, or other input/output mechanisms.

The communications circuitry 307 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 307 may include, for example, a network interface for enabling communications with a wired or wireless communication network. For example, the communications circuitry 307 may include one or more network interface cards, antennae, buses, switches, routers, modems, and supporting hardware and/or software, or any other device suitable for enabling communications via a network. Additionally or alternatively, the communications circuitry 307 may include the circuitry for interacting with the antenna/antennae to cause transmission of signals via the antenna/antennae or to handle receipt of signals received via the antenna/antennae.

Database circuitry 309 includes hardware configured to manage one or more network databases, including database shards 113A-113N and the main database 111. The database circuitry 309 may utilize processing circuitry, such as the processor 301, to perform these actions. The database circuitry 309 may transmit data to the interface generation circuitry 311 and referential table generation circuitry 313. In some preferred and non-limiting embodiments, the data sent may be associated with the one or more database shards 113A-113N.

In some embodiments, the database circuitry 309 may include a separate processor, specially configured Field Programmable Gate Array (FPGA), or Application Specific Integrated Circuit (ASIC). In some implementations, the referential table generation circuitry 313 and the interface generation circuitry 311, described below, may be sub-circuitries belonging to database circuitry 309. The database circuitry 309 may be implemented using hardware components of the apparatus configured by either hardware or software for implementing the functions described herein.

The referential table generation circuitry 313 includes hardware configured to generate and update shard referential table store in the main database 111. The referential table generation circuitry 313 may utilize processing circuitry, such as the processor 301, to perform these actions. However, it should also be appreciated that, in some embodiments, the referential table generation circuitry 313 may include a separate processor, specially configured Field Programmable Gate Array (FPGA), or Application Specific Integrated Circuit (ASIC) for performing the functions described herein. The referential table generation circuitry 313 may be implemented using hardware components of the apparatus configured by either hardware or software for implementing these planned functions.

The interface generation circuitry 311 includes hardware configured to generate communication channel interfaces for client devices 101A-101N. The interface generation circuitry 311 may utilize processing circuitry, such as the processor 301, to perform these actions. However, it should also be appreciated that, in some embodiments, the interface generation circuitry 311 may include a separate processor, specially configured Field Programmable Gate Array (FPGA), or Application Specific Integrated Circuit (ASIC) for performing the functions described herein. The interface generation circuitry 311 may be implemented using hardware components of the apparatus configured by either hardware or software for implementing these planned functions.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 301 may provide processing functionality, the memory 303 may provide storage functionality, the communications circuitry 307 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows for Generating Externally Shared Communication Channels

FIGS. 4, 5, 6, and 7 illustrate various interactions between one or more client devices 101A-101N and the group-based communication platform 105 in generating an externally shared communication channel based on whether the initiator and the target of the shared communication channel generation query is an administrator of a group.

The term "administrator" refers to a subscriber of a communication channel who has authority to manage the communication channel and make decisions on behalf of other subscribers regarding various maintenance tasks. For example, a group administrator may have the authority to set a communication channel as either "public" or "private." As another example, when receiving a request to create an externally shared communication channel, only a group administrator has the authority to accept the request on behalf of the group. In some embodiments, the system uses a flag on data associated with a user to indicate whether the user is a member of a group.

Referring now to FIG. 4, the process 400 illustrates an example process of generating an externally shared communication channel when a non-administrator of group A submits a request to create a shared communication channel targeting a non-administrator of group B.

The process 400 starts at step 402, where a non-administrator of group A submits a request to create an externally shared communication channel. The system automatically creates an invite for the non-administrator of group A, and shares the invite with the non-administrator of group B at step 404. Here, an invite is an electronic indication of the request to create an externally shared communication channel. For example, an invite can take the form of a Uniform Resource Locator (URL) that links to a webpage containing details of the request. In some embodiments, the URL link may expire after a predetermined amount of time has passed since the URL link has been transmitted. For example, a user may set the URL to expire after 24 hours of transmission.

The non-administrator of group B receives the invite at step 406. At step 408, the non-administrator of group B makes an initial decision as to whether to add a channel. If the non-administrator of group B decides not to add the channel, then the non-administrator of group A receives an electronic indication that the request has been denied at step 410.

If the non-administrator of group B decides to add the channel, then the system automatically forwards the request to create an externally shared communication channel to an administrator of group A and an administrator of group B at steps 412 and 414, respectively. If the administrator of group A does not approve the request at step 416, then the non-administrators of group A and group B receive electronic indications that the request has been denied at step 420. Similarly, if the administrator of group B does not approve the request at step 418, then the non-administrators of group A and group B receive electronic indications that the request has been denied at step 420.

When both the administrator of group A and the administrator of group B approve the request, the system proceeds with the creation of an externally shared communication channel at step 422.

Referring now to FIG. 5, the process 500 illustrates an example process of generating an externally shared communication channel when a non-administrator of group A submits a request to create a shared communication channel targeting an administrator of group B.

The process 500 starts at step 501, where a non-administrator of group A submits a request to create an externally shared communication channel. The system automatically creates an invite for the non-administrator of group A, and shares the invite with the administrator of group B at step 503.

Upon sharing the invite with the administrator of group B, the system automatically generates a request for approval at step 505. The administrator of group B then decides whether to approve the request to create an externally shared communication channel at step 507. If the administrator of group B does not approve the request, then the non-administrator of group A receives an electronic indication that the request has been denied at step 509.

If the administrator of group B approves the request, then the system automatically forwards the request to an administrator of group A at step 511. If the administrator of group A does not approve the request at step 513, then both the administrator and the non-administrator of group B receive electronic indications that the request has been denied at step 515.

If the administrator of group A approves the request at step 513, the system proceeds with the creation of an externally shared communication channel at step 517.

Referring now to FIG. 6, the process 600 illustrates an example process of generating an externally shared communication channel when an administrator of group A submits a request to create a shared communication channel targeting a non-administrator of group B.

The process 600 starts at step 602, where an administrator of group A submits a request to create an externally shared communication channel. The system automatically creates an invite for the administrator of group A, and shares the invite with the non-administrator of group B at step 604.

The non-administrator of group B receives the invite at step 606. At step 608, the non-administrator of group B makes an initial decision as to whether to add a channel. If the non-administrator of group B decides not to add the channel, then the administrator of group A receives an electronic indication that the request has been denied at step 610.

If the non-administrator of group B decides to add the channel, then the system automatically forwards the request to create externally shared communication channel to the administrator of group A and an administrator of group B at steps 612 and 614, respectively. If the administrator of group A does not approve the request at step 616, then the non-administrators of group B receives an electronic indication that the request has been denied at step 620. Similarly, if the administrator of group B does not approve the request at step 618, then the non-administrator of group B receives an electronic indication that the request has been denied at step 620.

When both the administrator of group A and the administrator of group B approve the request, the system proceeds with the creation of an externally shared communication channel at step 622.

Referring now to FIG. 7, the process 700 illustrates an example process of generating an externally shared communication channel when an administrator of group A submits a request to create a shared communication channel targeting an administrator of group B.

The process 700 starts at step 701, where an administrator of group A submits a request to create an externally shared communication channel. The system automatically creates an invite for the administrator of group A, and shares the invite with an administrator of group B at step 703.

Upon sharing the invite with the administrator of group B, the system automatically generates a request for approval at step 705. The administrator of group B then decides whether to approve the request to create an externally shared communication channel at step 707. If the administrator of group B does not approve the request, then the administrator of group A receives an electronic indication that the request has been denied at step 709.

If the administrator of group B approves the request, then the system automatically forwards the request to the administrator of group A at step 711. If the administrator of group A does not approve the request at step 713, then the administrator of group B receives an electronic indication that the request has been denied at step 715. If the administrator of group A approves the request, the system proceeds with the creation of an externally shared communication channel at step 717.

Example Implementation for Externally Shared Communication Channels

FIGS. 8A, 8B, 8C, and 8D illustrate various elements of example communication channel interfaces according to some embodiments of the present invention.

Figure 8A:
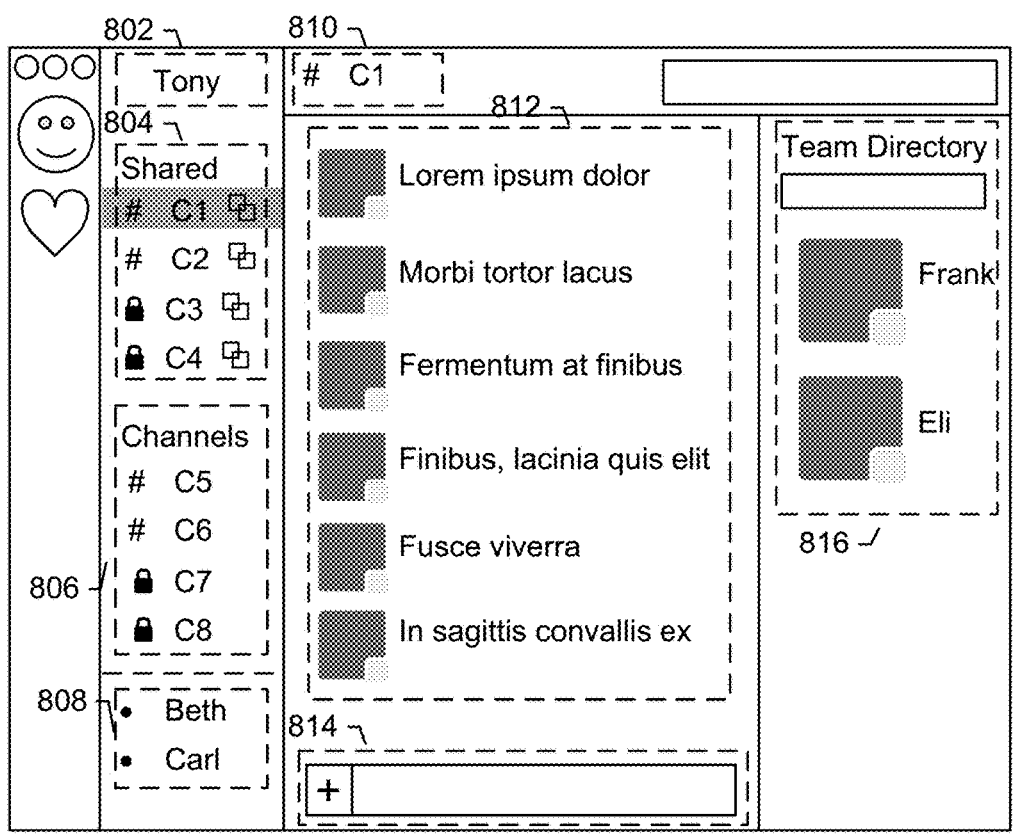

Referring now to FIG. 8A, an example communication channel interface 800A is shown. The communication channel interface 800A includes a user name box 802, indicating the current user account associated with the communication channel interface 800A.

The communication channel interface 800A also may also include a channel list pane, which may include an externally shared communication channel list subpane 804. The externally shared communication channel list subpane 804 allows a user to quickly and easily navigate all externally shared communication channels that the user has subscribed to. For example, as shown in FIG. 8A, the user Tony has subscribed to externally shared communication channels C1, C2, C3, and C4, which are indicated by an overlapping square symbol to the right of each channel name. Each group may set its preference as to the name of an externally shared communication channel in the externally shared communication channel list subpane 804.

The channel list pane of the communication channel interface 800A may further include an internally shared communication channel list subpane 806, which lists all internally shared communication channels that a user has subscribed to. In contrast to those listed in the externally shared communication channel list subpane 804, all channels in the internally shared communication channel list subpane 806 are shared with other users within the same group or organization.

A channel in the externally shared communication channel list subpane 804 or the internally shared communication channel list subpane 806 can be a private channel or a public channel. The status of the channel may be indicated by an icon to the left of the channel name. For example, as shown in the internally shared communication channel list subpane 806 of FIG. 8A, channels C5 and C6 each has a pound sign next to its name, which indicates that they are public channels; channels C7 and C8 each has a lock sign next to its name, which indicates that they are private channels.

The communication channel interface 800A further includes a channel title box 810 and a direct message pane 808. The direct message pane 808 lists all the members who share the same channel as the user. For example, as shown in the direct message pane 808 of FIG. 8A, the user may send a direct message to Beth or Carl, who share the same channel C1 as the user. In connection with the direct message pane 808, the communication channel interface 800A may further include a flexpane 816, which may display information such as member directory of a group. The member directory may be browseable, searchable, and filterable through the flexpane 816.

In some embodiments, the display of the member directory may be determined based on the retention settings. The retention setting may further determine which applications are installed on the channel, which features are enabled for the channel, and other preferences regarding which users are allowed to control the channel.

In addition, the communication channel interface 800A includes a channel messaging pane 812, which displays text, images, and other history data associated with the communication channel. In some embodiments, the history data may include changes to membership, such as when a user join or leave a channel, when an application is installed or removed from a channel.

In some embodiments, the viewing privilege settings of some content (i.e. who may view these content) in the channel messaging pane 812 may be specific to the user and hidden from public view. For example, when a user use a command to interact privately with an application or a bot, such activities may be hidden from the public view. A user may also choose to make such activities viewable by the public.

In some embodiments, the viewing privilege settings may be specific to the team and/or applications installed on the team. For example, when Tony from organization X wants to use a command, the command menu will only show commands from applications that have been installed on organization X.

Figure 8B:
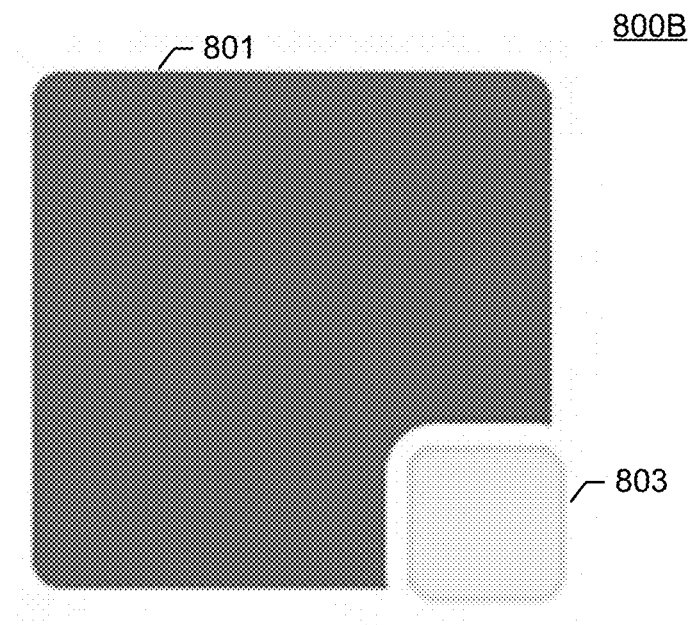

A user may use the channel input box 814 to contribute to the communication channel, which would be displayed in the channel messaging pane 812. The channel input box 814 may provide autocomplete function, which automatically recognizes user name, channel name, and other information as a user types in the channel input box 814. In some embodiments, the auto-complete box may also recognize the names of applications and other bots to further interact with the channel. The channel input box 814 may also provide message input warnings when a user is in an externally shared communication channel, alerting the user that any information he or she contributed may be seen by members of another group or organization. Referring now to FIG. 8B, an example user icon 800B is shown. The user icon 800B may include a user avatar 801 and a group icon 803. The user avatar 801 may indicate the identity of a user, and the group icon 803 may indicate the group that the user is associated with. In some preferred and non-limiting embodiments, the user avatar 801 may have a size of 72 px by 72 px, with 4 px rounded corners. The group icon 803 may have a size of 22 px by 22 px, with 4 px rounded corners, 1 px inner border, and 3 px outer border.

Figure 8C:
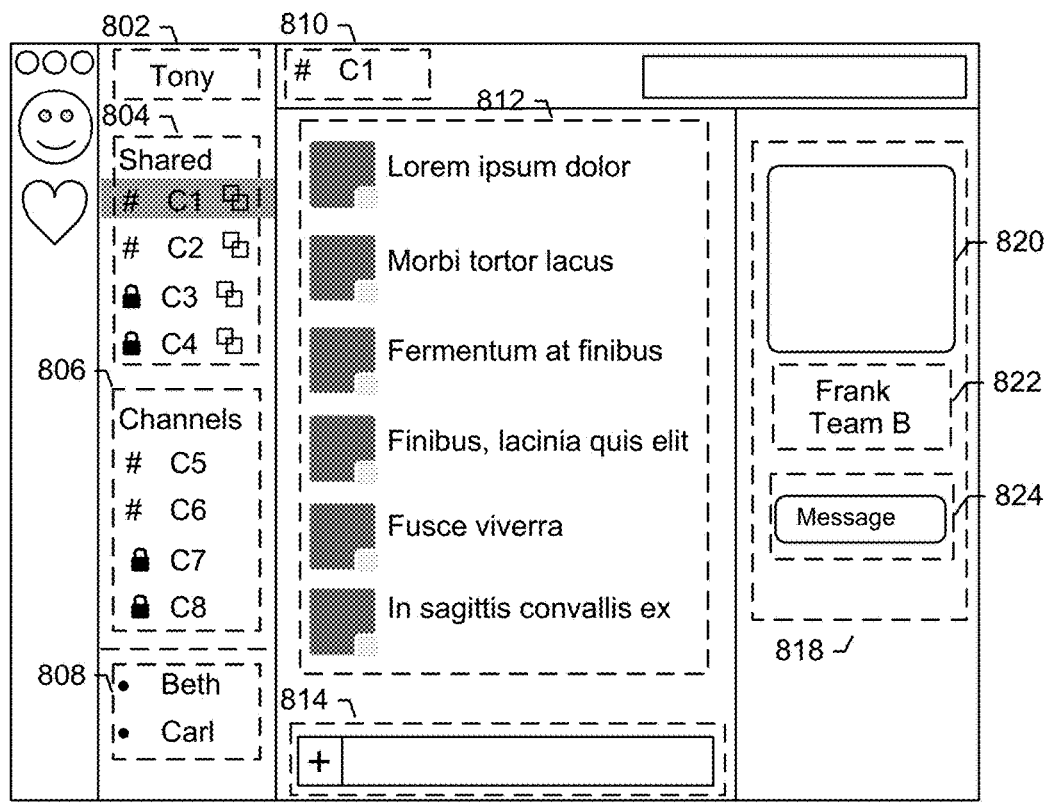

Referring now to FIG. 8C, an example communication channel interface 800C is shown. The communication channel interface 800C may include a group member profile card 818, which may further include a profile picture 820 of a group member, a group identification box 822 and function buttons 824. The group identification box 822 may include information such as the name of the group that the group member is associated with. The function buttons 824 may allow the user to perform various functions, such as sending a direct message to the group member.

Figure 8D:
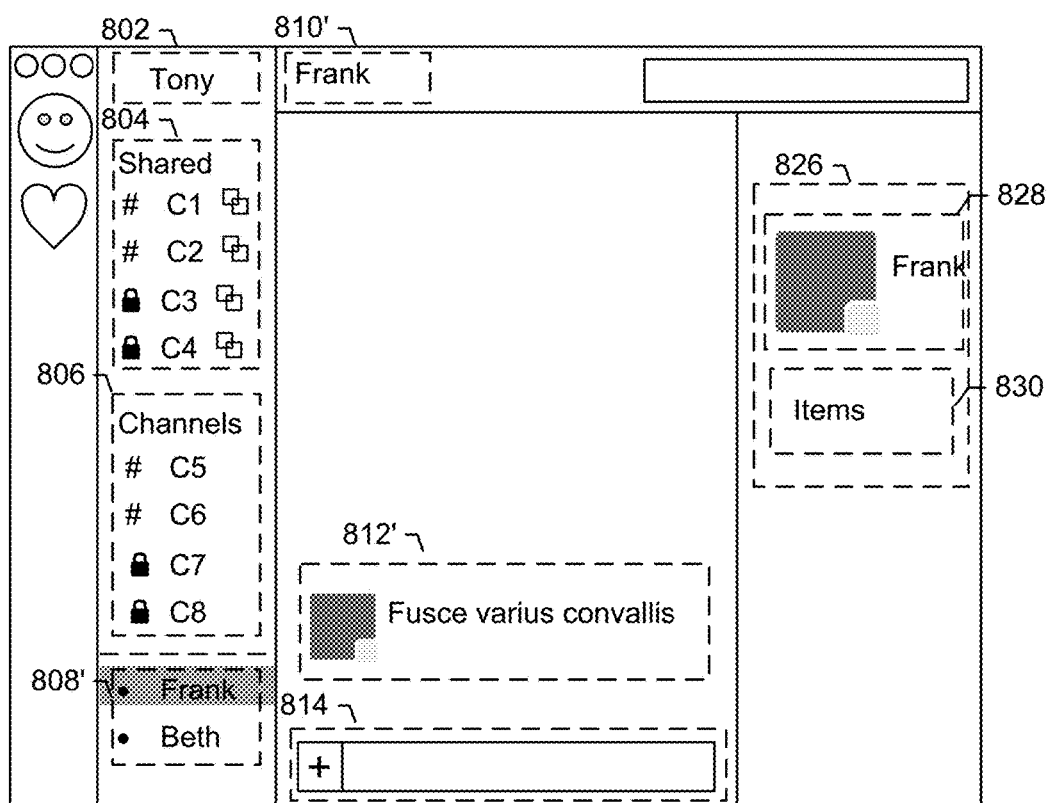

Referring now to FIG. 8D, the user interface 800D illustrates an example interface for direct messaging with a group member. The user interface 800D may include a member name box 810', which indicates the name of the group member with whom the user is direct messaging. The communication pane 812' shows direct messaging history between the user and the group member. The user interface 800D may further includes a direct message profile pane 826, which may include a user information section 828 and a related information section 830. The direct message profile pane 826 enables a user to quickly and easily recognize basic information about the group member with whom the user is direct messaging.

Example Application Programming Interface (API) Design for Implementing Embodiments of the Present Invention In some embodiments, systems structured in accordance with embodiments of the present invention may provide Application Programming Interfaces (APIs) that enable configurability of applications and bots in an externally shared communication channel.

Existing systems are plagued by technical limitations. For example, some existing systems fail to roll up member teams in an externally shared communication channel, while others fail to emit events to users whose group-based communication channels are not stored on the same shard.

Various embodiments of the present invention provide technical improvements over existing systems. As described above, a shared communication channel shard may be generated to store data related to an externally shared communication channel. In some embodiments of the present invention, an events subscription table (e.g., "event_subscriptions_types") may be stored in the shared communication channel shard. The events subscription table stores information regarding whether to emit events to members in an externally shared communication channel. To solve the above-identified technical difficulties, the events subscription table may be updated to include a "resource_id" column and a "resource_type" column. The "resource_id" column stores the identification of the resource (e.g. event), and the "resource_type" column identifies the type of the resource (e.g., whether the event is subscribed by teams whose group-based communication channels are stored on different shards). By utilizing these two columns, embodiments of the present invention solve the issues of where and how to store consolidated event registration information for applications installed on a group-based communication channel. Continuing from the "Tony to Frank" example, the externally shared communication channel may utilize the "resource_type" column and the "resource_id" column to store information regarding whether organization X and/or organization Y is subscribed to a particular resource (i.e. event).

The programming code below provides alteration of the "event_subscriptions_types" table to include "resource_type" and "resource_id" columns:

```
ALTER TABLE event_subscriptions_types ADD COLUMN
resource_type varchar(25) NOT NULL AFTER team_id
ALTER TABLE event_subscriptions_types ADD COLUMN resource_id
bigint(20) UNSIGNED NOT NULL AFTER resource_type
ALTER TABLE event_subscriptions_types ADD COLUMN
ext_team_id bigint(20) UNSIGNED NOT NULL AFTER team_id
ALTER TABLE event_subscriptions_types DROP PRIMARY KEY,
ADD PRIMARY KEY
event_subscription_id, team_id, event_type, resource_type,
resource_id)
```

In some embodiments of the present invention, a "channel_id" column and an "event_subscription_id" column may be added to the "event_subscriptions_types" table. The "channel_id" column identifies the group-based communication channel, and the "event_subscription_id" identifies the events that each group-based communication channel is subscribed to. Continuing from the "Tony to Frank" example, the "channel_id" column and the "event_subscription_id" column store information regarding what events each of organization X and organization Y has subscribed to.

Further, some embodiments of the present invention may also create a new table in the shared communication channel shard, such as "event_subscriptions_ext_shared," to separately store event subscription information for each team. The programming code below provides the creation of the "event_subscriptions_ext_shared" table.

```
CREATE TABLE 'event_subscriptions_ext_shared' (
    'subscription_team_id' bigint(20) UNSIGNED NOT NULL,
    'channel_id' bigint(20) UNSIGNED NOT NULL,
    'api_app_id' bigint(20) UNSIGNED NOT NULL,
    'event_type' varchar(255) NOT NULL
    PRIMARY KEY ('subscription_t_team_id', 'channel_id',
    'event_type')
) ENGINE=InnoDB DEFAULT CHARSET=utf8mb4;
```

Additional Implementation Details

Although example processing systems have been described in FIGS. 2 and 3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. A computer-implemented method for creating an externally shared communication channel in a group-based communication platform, the group-based communication platform having a plurality of database shards, the computer-implemented method comprising:
    receiving, from a first client device associated with an initiator group identification, a shared communication channel generation query associated with the initiator group identification and a target group identification;
    generating, in the group-based communication platform, a shared communication channel shard, wherein the shared communication channel shard is assigned a shared communication channel identification, and the group-based communication platform includes a first database shard associated with the initiator group identification and a second database shard associated with the target group identification;
    transmitting, to a second client device associated with the target group identification, a shared communication channel acceptance request, wherein the shared communication channel acceptance request is associated with the shared communication channel identification;
    receiving a shared communication channel acceptance notification, wherein the shared communication channel acceptance notification includes an electronic approval to associate the shared communication channel identification with the target group identification;
    updating, in a main database, a shard referential table based on the initiator group identification, the target group identification, and the shared communication channel identification; and
    transmitting, to each of the first client device and the second client device, an externally shared group-based shared communication channel interface of the shared communication channel based on the shared communication channel shard.

2. A computer-implemented method of claim 1, wherein the shard referential table includes a first referential connection between the initiator group identification and the first database shard, and a second referential connection between the target group identification and the second database shard.

3. A computer-implemented method of claim 2, wherein updating the shard referential table further includes:
    identifying, based on the initiator group identification, the first referential connection in the shard referential table;
    identifying, based on the target group identification, the second referential connection in the shard referential table; and
    generating a third referential connection between the first referential connection, the second referential connection, and the shared communication channel identification.

4. A computer-implemented method of claim 1, further comprising:

determining that the first client device and the second client device are each associated with a non-administrator status indicator;
transmitting, to a third client device associated with the initiator group identification and an initiator administrator status indicator, an initiator shared communication channel approval request;
transmitting, to a fourth client device associated with the target group identification and a target administrator status indicator, a target shared communication channel approval request;
receiving an initiator shared communication channel approval notification from the third client device; and
receiving a target shared communication channel approval notification from the fourth client device.

5. A computer-implemented method of claim 1, further comprising:
determining that the first client device is associated with a non-administrator status indicator and the second client device is associated with a target administrator status indicator;
transmitting, to a third client device associated with the initiator group identification and an initiator administrator status indicator, an initiator shared communication channel approval request; and
receiving an initiator shared communication channel approval notification from the third client device.

6. A computer-implemented method of claim 1, further comprising:
determining that the first client device is associated with an initiator administrator status indicator and the second client device is associated with a non-administrator status indicator;
transmitting, to the first client device, an initiator shared communication channel approval request;
transmitting, to a third client device associated with the target group identification and an target administrator status indicator, a target shared communication channel approval request;
receiving an initiator shared communication channel approval notification from the first client device; and
receiving a target shared communication channel approval notification from the third client device.

7. A computer-implemented method of claim 1, wherein the first client device and the second client device are each associated with an administrator status indicator.

8. An apparatus for creating an externally shared communication channel in a group-based communication platform, the group-based communication platform having a plurality of database shards, the apparatus comprising at least one processor and at least one non-transitory memory including program code, the at least one non-transitory memory and the program code configured to, with the processor, cause the apparatus to at least:
receive, from a first client device associated with an initiator group identification, a shared communication channel generation query associated with the initiator group identification and a target group identification;
generate, in the group-based communication platform, a shared communication channel shard, wherein the shared communication channel shard is assigned a shared communication channel identification, and the group-based communication platform includes a first database shard associated with the initiator group identification and a second database shard associated with the target group identification;
transmit, to a second client device associated with the target group identification, a shared communication channel acceptance request, wherein the shared communication channel acceptance request is associated with the shared communication channel identification;
receive a shared communication channel acceptance notification, wherein the shared communication channel acceptance notification includes an electronic approval to associate the shared communication channel identification with the target group identification;
update, in a main database, a shard referential table based on the initiator group identification, the target group identification, and the shared communication channel identification; and
transmit, to each of the first client device and the second client device, an externally shared group-based shared communication channel interface of the shared communication channel based on the shared communication channel shard.

9. An apparatus of claim 8, wherein the shard referential table includes a first referential connection between the initiator group identification and the first database shard, and a second referential connection between the target group identification and the second database shard.

10. An apparatus of claim 9, wherein updating the shard referential table further includes:
identifying, based on the initiator group identification, the first referential connection in the shard referential table;
identifying, based on the target group identification, the second referential connection in the shard referential table; and
generating a third referential connection between the first referential connection, the second referential connection, and the shared communication channel identification.

11. An apparatus of claim 8, wherein the at least one non-transitory memory and the program code configured to, with the processor, cause the apparatus to further:
determine that the first client device and the second client device are each associated with a non-administrator status indicator;
transmit, to a third client device associated with the initiator group identification and an initiator administrator status indicator, an initiator shared communication channel approval request;
transmit, to a fourth client device associated with the target group identification and a target administrator status indicator, a target shared communication channel approval request;
receive an initiator shared communication channel approval notification from the third client device; and
receive a target shared communication channel approval notification from the fourth client device.

12. An apparatus of claim 8, wherein the at least one non-transitory memory and the program code configured to, with the processor, cause the apparatus to further:
determine that the first client device is associated with a non-administrator status indicator and the second client device is associated with a target administrator status indicator;
transmit, to a third client device associated with the initiator group identification and an initiator administrator status indicator, an initiator shared communication channel approval request; and
receive an initiator shared communication channel approval notification from the third client device.

13. An apparatus of claim 8, wherein the at least one non-transitory memory and the program code configured to, with the processor, cause the apparatus to further:
  determine that the first client device is associated with an initiator administrator status indicator and the second client device is associated with a non-administrator status indicator;
  transmit, to the first client device, an initiator shared communication channel approval request;
  transmit, to a third client device associated with the target group identification and an target administrator status indicator, a target shared communication channel approval request;
  receive an initiator shared communication channel approval notification from the first client device; and
  receive a target shared communication channel approval notification from the third client device.

14. An apparatus of claim 8, wherein the first client device and the second client device are each associated with an administrator status indicator.

15. A computer program product for creating an externally shared communication channel in a group-based communication platform, the group-based communication platform having a plurality of database shards, the computer program product comprising at least one non-transitory computer-readable storage medium having computer-readable program code portions stored therein, the computer-readable program code portions comprising an executable portion configured to:
  receive, from a first client device associated with an initiator group identification, a shared communication channel generation query associated with the initiator group identification and a target group identification;
  generate, in the group-based communication platform, a shared communication channel shard, wherein the shared communication channel shard is assigned a shared communication channel identification, and the group-based communication platform includes a first database shard associated with the initiator group identification and a second database shard associated with the target group identification;
  transmit, to a second client device associated with the target group identification, a shared communication channel acceptance request, wherein the shared communication channel acceptance request is associated with the shared communication channel identification;
  receive a shared communication channel acceptance notification, wherein the shared communication channel acceptance notification includes an electronic approval to associate the shared communication channel identification with the target group identification;
  update, in a main database, a shard referential table based on the initiator group identification, the target group identification, and the shared communication channel identification; and
  transmit, to each of the first client device and the second client device, an externally shared group-based shared communication channel interface of the shared communication channel based on the shared communication channel shard.

16. A computer program product of claim 15, wherein the shard referential table includes a first referential connection between the initiator group identification and the first database shard, and a second referential connection between the target group identification and the second database shard.

17. A computer program product of claim 16, wherein updating the shard referential table further includes:
  identifying, based on the initiator group identification, the first referential connection in the shard referential table;
  identifying, based on the target group identification, the second referential connection in the shard referential table; and
  generating a third referential connection between the first referential connection, the second referential connection, and the shared communication channel identification.

18. A computer program product of claim 15, wherein the executable portion of the computer-readable program code portions is further configured to:
  determine that the first client device and the second client device are each associated with a non-administrator status indicator;
  transmit, to a third client device associated with the initiator group identification and an initiator administrator status indicator, an initiator shared communication channel approval request;
  transmit, to a fourth client device associated with the target group identification and a target administrator status indicator, a target shared communication channel approval request;
  receive an initiator shared communication channel approval notification from the third client device; and
  receive a target shared communication channel approval notification from the fourth client device.

19. A computer program product of claim 15, wherein the executable portion of the computer-readable program code portions is further configured to:
  determine that the first client device is associated with a non-administrator status indicator and the second client device is associated with a target administrator status indicator;
  transmit, to a third client device associated with the initiator group identification and an initiator administrator status indicator, an initiator shared communication channel approval request; and
  receive an initiator shared communication channel approval notification from the third client device.

20. A computer program product of claim 15, wherein the executable portion of the computer-readable program code portions is further configured to:
  determine that the first client device is associated with an initiator administrator status indicator and the second client device is associated with a non-administrator status indicator;
  transmit, to the first client device, an initiator shared communication channel approval request;
  transmit, to a third client device associated with the target group identification and an target administrator status indicator, a target shared communication channel approval request;
  receive an initiator shared communication channel approval notification from the first client device; and
  receive a target shared communication channel approval notification from the third client device.

* * * * *